United States Patent
Li et al.

(10) Patent No.: US 12,147,530 B2
(45) Date of Patent: Nov. 19, 2024

(54) DEPLOYING ENCLAVES ON DIFFERENT TEE BACKENDS USING A UNIVERSAL ENCLAVE BINARY

(71) Applicant: VMware, Inc., Palo Alto, CA (US)

(72) Inventors: Ye Li, Newton Highlands, MA (US); Anoop Jaishankar, Fremont, CA (US); John Manferdelli, San Francisco, CA (US); David Ott, Chandler, AZ (US); Andrei Warkentin, South Elgin, IL (US)

(73) Assignee: VMware LLC, Palo Alto, CA (US)

( * ) Notice: Subject to any disclaimer, the term of this patent is extended or adjusted under 35 U.S.C. 154(b) by 234 days.

(21) Appl. No.: 17/960,738

(22) Filed: Oct. 5, 2022

(65) Prior Publication Data

US 2024/0119138 A1   Apr. 11, 2024

(51) Int. Cl.
 *G06F 21/53* (2013.01)
 *G06F 21/12* (2013.01)
 *G06F 21/54* (2013.01)

(52) U.S. Cl.
 CPC .......... *G06F 21/53* (2013.01); *G06F 21/121* (2013.01); *G06F 21/54* (2013.01)

(58) Field of Classification Search
 CPC .................................................. G06F 21/53
 See application file for complete search history.

(56) References Cited

U.S. PATENT DOCUMENTS

| | | | |
|---|---|---|---|
| 2016/0350534 A1* | 12/2016 | Poornachandran | ... G06F 21/554 |
| 2017/0026181 A1* | 1/2017 | Chhabra | ............... H04L 9/3234 |
| 2018/0211054 A1* | 7/2018 | Costa | ...................... G06F 21/64 |
| 2018/0211067 A1* | 7/2018 | Costa | ................... H04L 9/3247 |

* cited by examiner

*Primary Examiner* — Bradley W Holder
(74) *Attorney, Agent, or Firm* — King Intellectual Asset Management

(57) ABSTRACT

The disclosure herein describes deploying a Virtual Secure Enclave (VSE) using a universal enclave binary and a Trusted Runtime (TR). A universal enclave binary is generated that includes a set of binaries of Instruction Set Architectures (ISAs) associated with Trusted Execution Environment (TEE) hardware backends. A TEE hardware backend is identified in association with a VSE-compatible device. A VSE that is compatible with the identified TEE hardware backend is generated on the VSE-compatible device and an ISA binary that matches the TEE hardware backend is selected from the universal enclave binary. The selected binary is linked to a runtime library of the TR and loads the linked binary into memory of the generated VSE. The execution of a trusted application is initiated in the generated VSE using a set of interfaces of the TR. The trusted application depends on the TR interfaces rather than the selected ISA binary.

20 Claims, 6 Drawing Sheets

DEPLOYING ENCLAVES ON DIFFERENT TEE BACKENDS USING A UNIVERSAL ENCLAVE BINARY

BACKGROUND

Trusted Execution Environment (TEE) technology diversity has grown rapidly in recent years. Recent advances have revitalized the interest in using TEEs for integrity and confidentiality protection of secure applications in public and hybrid cloud environments. With the growing diversity of hardware technologies comes the challenge of secure application development and deployment complexities, including recompiling of source code to switch between different hardware backends.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for deploying a Virtual Secure Enclave (VSE) using a universal enclave binary and a Trusted Runtime (TR) is described. The method generates a universal enclave binary that includes a set of binaries of Instruction Set Architectures (ISAs) associated with Trusted Execution Environment (TEE) hardware backends. A TEE hardware backend is then identified in association with a VSE-compatible device. A VSE that is compatible with the identified TEE hardware backend is generated on the VSE-compatible device and a binary of an ISA that matches the identified TEE hardware backend is selected from the universal enclave binary. The method links the selected binary to a runtime library of the TR and then loads the linked binary into memory of the generated VSE. The execution of a trusted application is initiated in the generated VSE using a set of interfaces of the TR.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
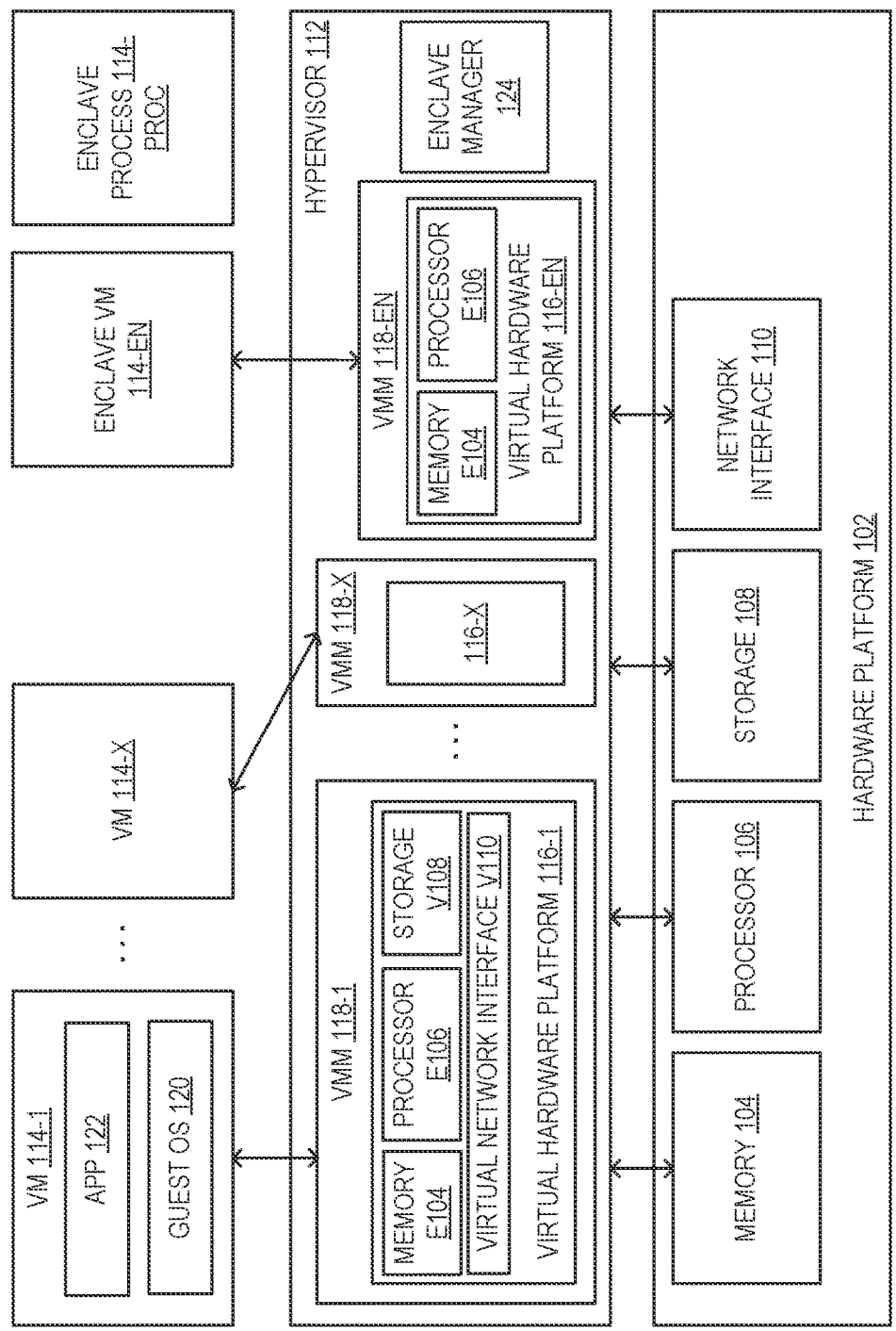
FIG. 1 is a block diagram illustrating a computer system in accordance with an embodiment of the invention.

Aspects of the disclosure provide a computerized method and system for deploying and using a Virtual Secure Enclave (VSE) using a universal enclave binary and Trusted Runtime (TR). The disclosure describes deploying and configuring an enclave in the form of a VSE that is compatible with multiple different types of TEE hardware backends. The disclosure generates a universal enclave binary that stores multiple ISA binaries associated with different TEE hardware backends. The VSE is generated and placed on a VSE-compatible device that is configured as a particular TEE hardware backend. This TEE hardware backend is identified, and an ISA binary associated with the TEE hardware backend is selected from the universal enclave binary. That ISA binary is linked to the runtime library of the TR of the VSE and the linked binary is then loaded into the memory of the VSE. A trusted application is executed on the VSE using a set of interfaces of the TR, which make use of the runtime library of the TR as described herein.

The disclosure operates in an unconventional manner at least by creating a level of abstraction between the ISA binaries and the applications that are configured to use them. The TR of the VSE provides consistent interfaces, regardless of the type of TEE hardware backend and/or ISA binary that underlies the VSE after it is deployed. Applications that use the VSE can be configured to depend on those consistent interfaces for performing enclave operations, such that those applications can be used with any VSE without additional compiling or configuration based on the type of TEE hardware backend upon which it is deployed.

Further, the disclosure reduces the consumption of processing resources and/or other resources of a computing system due to repeated compilation of applications to account for differing hardware backends. Such applications can be configured to treat the described VSEs as consistent, universal backend interfaces, thereby limiting and/or eliminating the need to recompile the application based on hardware backend differences.

Additionally, the disclosure reduces time and effort required of application developers and conserves computing resources associated with the development process by simplifying the design and development of application parts that will interact with the VSE rather than other enclaves. Developers need not spend time and effort on configuring their applications to handle multiple different types of TEE hardware backends, which can speed up and/or streamline the development process.

Still further, the disclosure provides an enclave platform that is flexible and dynamic, enabling associated deployed VSEs to function with different types of TEE hardware backends over time by enabling the contents of the universal enclave binary to be altered and/or updated. In some such examples, an additional ISA binary is added to the universal enclave binary. As a result, all VSEs deployed after the addition of the ISA binary are configured to be compatible with the new ISA binary and associated TEE hardware backends. In some such cases, adding the new ISA binary includes updating the TR to properly link functions of the new ISA binary with the proper interfaces of the TR as described herein.

FIG. 1 is a block diagram illustrating a computer system 100 in accordance with an embodiment of the invention. The computer system provides a software-based Trusted Execution Environment (TEE) solution that offers memory enclaves as secure execution environments using virtualization as the control and management engine. In some examples, this software-based solution leverages hardware virtualization and memory encryption features which are widely available on modern hardware platforms but does not require any specific hardware TEE features. The described software-based solution provides the memory enclaves in a unified and highly available way, across multiple hardware platforms, and irrespective of whether the platform offers TEE features.

As shown in FIG. 1, the computer system 100 includes a physical hardware platform 102, which include components commonly found in a server-grade computer. In other examples, the hardware platform 102 includes other types of computer components without departing from the description. The physical hardware platform 102 includes at least one or more system memories 104, one or more processors 106, one or more storage components 108, and one or more network interfaces 110. Each system memory 104, which may be random access memory (RAM), is the volatile memory of the computer system 100. Each processor 106 can be any type of a processor, such as a central processing unit (CPU) commonly found in a personal computer. In some examples, at least one of the processors 106 of the computer system 100 is a processor with virtualization features that can provide strong isolation of memory and code, such as Intel Virtualization Technology (VT-x), Advanced Micro Devices (AMD) Secure Virtual Machine (SVM), or ARMv8-A processors. Further, in some examples, the storage 108 includes any type of non-volatile computer storage with one or more storage devices, such as a solid-state devices (SSDs) and hard disks. Although the storage 108 is shown in FIG. 1 as being a local storage, in other examples, the storage 108 is a remote storage, such as a network-attached storage (NAS). The network interface 110 is an interface that enables the computer system 100 to communicate with other devices through one or more computer networks. As an example, the network interface is a network interface controller (NIC).

The computer system 100 further includes a virtualization software layer, or hypervisor, 112 running directly on the hardware platform 102 or on an operation system (OS) of the computer system 100. The virtualization software layer 112 is configured to support one or more virtual computing instances (VCIs). In addition, in some examples, the virtualization software layer 112 deploys and/or creates VCIs on demand. As used in some examples herein, a VCI is any isolated software entity that can run on a computer system, such as a software application, a software process, a virtual machine (VM) or a virtual container. A VM is an emulation of a computer system in the form of a software computer that, like a physical computer, can run an operating system and applications. In some examples, the VM is comprised of a set of specification and configuration files and is backed by the physical resources of a physical host computer. Further, every VM is configured to have virtual devices that provide the same functionality as physical hardware and have additional benefits in terms of portability, manageability, and security. An example of a VM is the VM created using VMWARE VSPHERE®. Additionally, or alternatively, in some examples, a virtual container is a package that relies on virtual isolation to deploy and run applications that access a shared operating system (OS) kernel. An example of a virtual container is the virtual container created using a Docker engine made available by Docker, Inc. While, in many examples, the virtualization software layer 112 is described herein as supporting VMs, in other examples, the virtualization software layer 112 supports different types of VCIs without departing from the description.

In the illustrated embodiment, the virtualization software layer 112 is a hypervisor, which enables sharing of the hardware resources of the computer system 100 by VMs that are deployed by the hypervisor. One example of a hypervisor that may be used in an embodiment described herein is a VMware ESXi™ hypervisor provided as part of the VMware vSphere® solution made commercially available from VMware, Inc of Palo Alto, California.

In some examples, the hypervisor 112 provides a device driver layer configured to map physical resources of hardware platform 102 to "virtual" resources of each VM supported by the hypervisor. Thus, each VM has its own corresponding virtual hardware platform. In some examples, each such virtual hardware platform provides emulated or virtualized hardware (e.g., memory, processor, storage, network interface, etc.) that functions as an equivalent for conventional hardware architecture for its corresponding VM. Further, in some examples, in deploying VMs, the hypervisor 112 also installs user input device drivers in each VM so that user input devices, such as mice and keyboards, are usable with the VMs.

In FIG. 1, the computer system 100 is shown to include a number of VMs 114-1 to 114-$x$ supported by the hypervisor 112. Each of these VMs has a virtual hardware platform 116. Thus, the VM 114-1 has the virtual hardware platform 116-1, while the VM 114-$x$ has the virtual hardware platform 116-$x$. Each of the virtual hardware platforms 116 includes at least emulated memory E104, emulated processor E106, virtual storage V108 and virtual network interface V110, which correspond to the memory 104, the processor 106, the storage 108 and the network interface 110, respectively, of the hardware platform 102 of the computer system 100 (not shown in FIG. 1 for the virtual hardware platform 116-$x$). The virtual hardware platforms 116-1 to 116-$x$ may be considered part of virtual machine monitors (VMMs) 118-1 to 118-$x$ that implement virtual system support to coordinate operations between the hypervisor 112 and corresponding VMs 114-1 to 114-$x$.

With the support of the hypervisor 112, the VMs 114-1 to 114-$x$ provide isolated execution spaces for guest software. In some examples, a VM includes a guest operating system 120, and one or more guest applications 122. The guest operating system 120 manages virtual hardware resources made available to the corresponding VM 114 by the hypervisor 112, and, among other things, the guest operating system 120 forms a software platform on top of which the guest applications 122 run.

Further, in some examples, the computer system 100 with the deployed VMs 114-1 to 114-$x$ has various software processes running in the computer system 100. As used herein, software processes can be any software programs, applications or software routines that can run on one or more computers, which can be physical computers, virtual computers, such as VMs, or distributed computer systems. As an example, one or more software processes are running on the host OS of the computer system 100, one or more software processes are running on the guest OSs 120 of the VMs 114 as guest applications 122, and/or one or more software processes are running in the hypervisor 112. Some of these software processes protect sensitive content, such as codes and/or data. As used herein, codes of sensitive content refer to computer codes that can execute software routines, and/or data of sensitive content refers to any confidential information, such as encryption keys.

In order to provide secure execution environments for these software processes, the computer system 100 includes an enclave manager 124. In some examples, the enclave manager 124 executes or otherwise runs in the hypervisor 112 or in another part of the computer system 100. The enclave manager 124 operates to deploy one or more enclaves, such as enclave VCIs, which may be specialized VCIs, in the computer system 100 when one of the software processes requests a secure environment for codes and/or data. While the enclaves described in many examples herein are specifically enclave VMs, in other examples, the enclaves are any type of VCI without departing from the description.

An enclave VM provides a secure environment to store any codes and/or data that need to be protected. An enclave VM is similar to a regular or normal VM. However, in some examples, the enclave VM is configured so that it operates with minimal CPU and memory resources, includes no virtual devices, such as networking, storage, human devices, video graphics array (VGA) and other common VM virtual devices, and includes no operating system or other system software.

These simplifications to an enclave VM allow it to consume far fewer hardware resources than a conventional guest VM. Consequently, in some examples, the hypervisor 112 is configured to provision many more enclave VMs based on software process requests than conventional VMs. In addition, the provisioning time of each enclave VM is also dramatically decreased because no or minimal virtual device initialization and no or minimal system software initialization are required. Eliminating virtual devices and system software also minimizes the size of the Trusted Computing Base (TCB) of the framework, an important consideration in trusted execution environments (TEEs) which seek to minimize the attack surface of the solution and to minimize the complexity of security validation.

To further increase the confidentiality of the enclave VMs, in some examples, the enclave VMs uses generalized VM encryption technologies (e.g., technologies provided by AMD Secure Encrypted Virtualization (SEV) and Intel MKTME) when they are available on the underlying hardware platform. When this feature is used, the confidentiality of an encrypted enclave VM can be maintained even against the hypervisor itself. This is important in applications that demand strong privacy guarantees to comply with government or industry regulations in various contexts (e.g., defense or health care).

The enclave manager 124 operates to configure and deploy enclave VMs in response to requests from software processes, such as processes of applications 122 or other executing software programs. In some examples, the enclave VMs are deployed with minimal virtual CPU and memory (e.g., a single virtual CPU with a couple of megabytes of memory) and no virtual devices, such as networking, storage, human devices, VGA, and other common virtual devices found in VMs, and no operating system or other system software. Further, in some examples, the virtual CPU and memory for the enclave VMs vary depending on the actual enclave demands from the software processes during the creation of the enclave VMs. Once the enclave VMs are deployed and operating, the enclave manager can load sensitive content, e.g., codes and/or data to be protected, in the virtual volatile memory of the enclave VMs so that the contents securely stored in the enclave VMs can then be safely used by the requesting software processes or other software processes to perform one or more tasks. In some examples, if the underlying hardware platform provides for VM encryption technology, data stored in the virtual volatile memory of the enclave VMs is encrypted using the available VM encryption technology to ensure increased confidentiality of any content stored in the enclave VMs. After the tasks have been performed, the enclave VMs may be deleted by the enclave manager 124 if the enclave VMs are no longer needed by the requesting software processes or any other software processes.

In FIG. 1, one enclave VM 114-EN has been deployed in the computer system 100 and supported by the hypervisor 112. Thus, the hypervisor 112 includes a VMM 118-EN, which manages a virtual hardware platform 116-EN. In contrast to other virtual hardware platforms, the virtual hardware platform 116-EN for the enclave VM 114-EN includes only emulated volatile memory E104 and emulated processor E106. Thus, the virtual hardware platform 116-EN does not include any virtual non-volatile storage, virtual network interface or other virtual devices. In addition, the enclave VM does not include any system software, such as an operating system. Thus, the enclave VM 114-EN can be more readily deployed using less resources of the computer system 100 than standard guest VMs. In other examples, the enclave VM 114-EN and associated VMM 118-EN are configured to include and use other types of virtual hardware without departing from the description. Further, in some examples, the deployment and operation of the enclave VM 114-EN is performed as described herein with respect to FIGS. 2-5.

Further, in some examples, the system 100 includes an enclave process 114-PROC that is executed or otherwise performed to provide the enclave features as described herein. In such examples, the enclave process 114-PROC is not a virtual machine or container. In some such examples, the enclave process 114-PROC is a Software Guard Extensions (SGX) enclave or another similar type of enclave process. Additionally, in such examples, the system 100 includes the enclave process 114-PROC in addition to an enclave VM 114-EN or instead of an enclave VM 114-EN. It should be understood that the described universal runtime binary and associated trusted runtime can be used with an enclave process 114-PROC as well as an enclave VM 114-EN.

Figure 2:
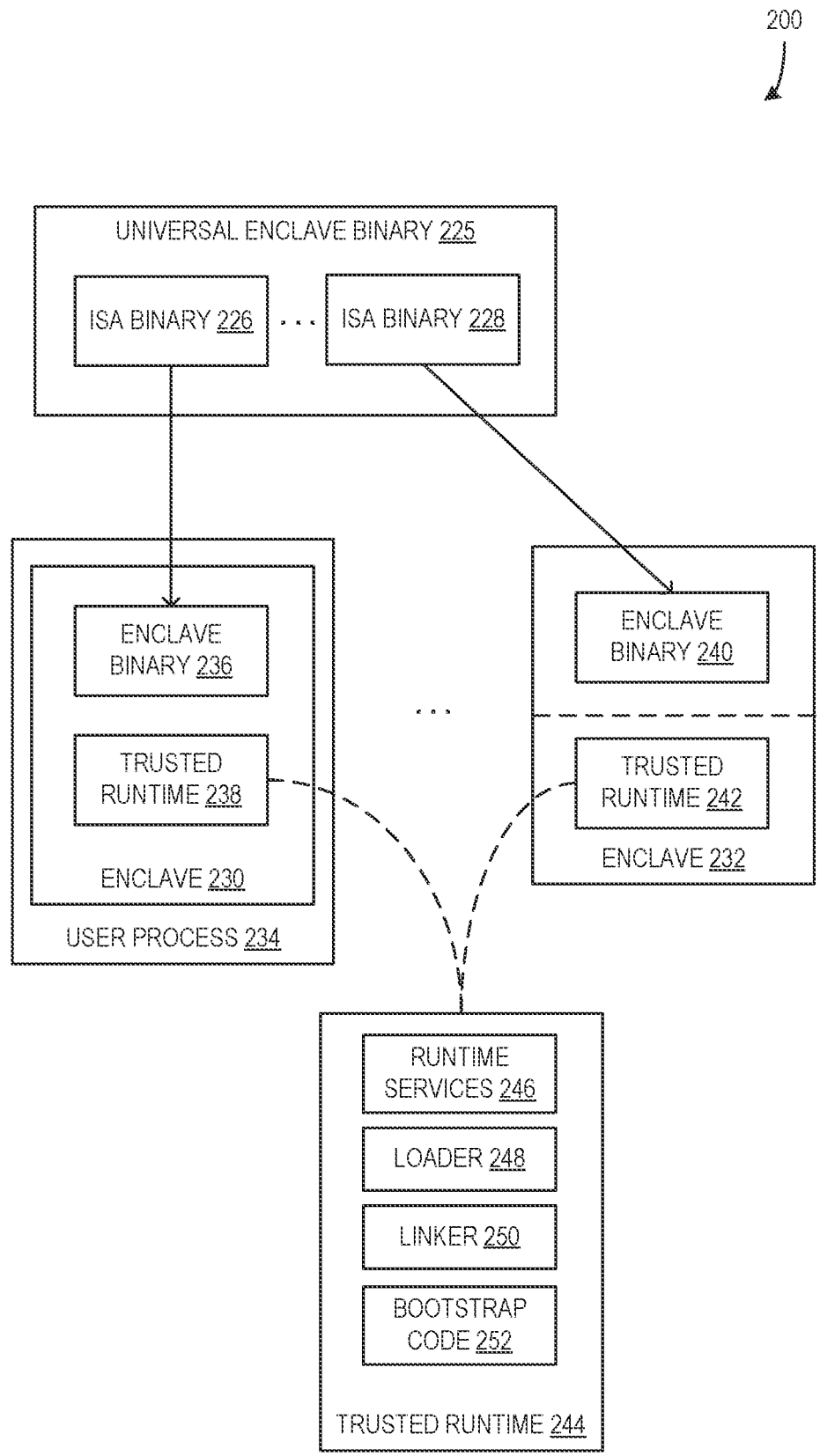
FIG. 2 is a block diagram illustrating a system configured to deploy enclaves using a universal enclave binary and a trusted runtime.

FIG. 2 is a block diagram illustrating a system 200 configured to deploy enclaves (e.g., enclaves 230-232) using a universal enclave binary 225 and a trusted runtime (TR) 244. In some examples, the system 200 is part of or otherwise associated with a system such as system 100 of FIG. 1. Further, in some such examples, the enclaves 230-232 that are deployed in the system 200 include Virtual Secure Enclaves (VSEs). A VSE is an enclave that is located on or otherwise associated with a VM or other VCI, rather than an enclave that is located directly on hardware. For instance, in an example, a VSE is the enclave VM 114-EN of FIG. 1.

The universal enclave binary 225 is configured to store a set or plurality of ISA binaries 226-228 that can be used in the deployment of enclaves 230-232 into different TEE hardware backends. In some examples, the universal enclave binary 225 is compiled into a position independent Executable and Linkable Format (ELF) binary. This is a bare-metal binary that does not include any TEE-specific architecture dependencies other than the corresponding core ISA features (e.g., x86 and/or Aarch64 instructions). In such examples, the only system dependencies are provided by the associated TR 244, as described herein. To support multiple ISAs, the universal enclave binary 225 is configured as a fat binary to combine the multiple ISA binaries 226-228. In an example, the universal enclave binary 225 includes binaries for x86 and Aarch64 instructions, which are compatible with and/or cover TEE hardware platforms including INTEL Software Guard Extensions (SGX), AMD SEV, INTEL Trust Domain Extensions (TDX), ARM TrustZone (TZ), and/or Realms.

In some examples, the universal enclave binary 225 is used with the TR 244 to deploy enclaves 230-232 as described herein. The TR 244 is a software entity that is used to create a dedicated execution environment for the enclave binary (e.g., binaries 236 and 240) and to hide or abstract away all hardware architectural discrepancies of the TEE hardware backends upon which the enclaves are deployed. In some such examples, the TR 244 is configured to be compatible with multiple TEE hardware backends (e.g., the backends for which the universal enclave binary 225 includes ISA binaries 226-228). For instance, as illustrated, each enclave 230 and 232 includes a TR instance 238 and 242, respectively. The system 200 is configured for compatibility with multiple TEE hardware backends, such that the enclaves can be deployed on those TEE hardware backends with reduced compiling and other related processing. Compatibility with a TEE hardware backend is dependent on a compatible ISA binary being present in the universal enclave binary 225 and on the trusted runtime 244 being configured for compatibility with that TEE hardware backend. Such configuration choices are made by a user during the configuration of the system 200 in some examples.

Further, in some examples, the TR 244 is configured to be technologically simpler and/or more computationally efficient than a small Operating System (OS), such that it does not provide a multi-processing environment with process and kernel isolations. In other examples, the TR 244 is configured to provide such features without departing from the description.

Additionally, or alternatively, in some examples, the TR 244 is included as part of the Trusted Computing Base (TCB) and attested using the hardware attestation mechanisms as part of the 2-stage attestation process. In an example where the TEE hardware backend is an INTEL SGX backend or similar, the TR 244 operates as a template trusted SGX enclave image that is deployed in a user process. For instance, see the enclave 230 that is deployed in the user process 234 in system 200. Alternatively, or additionally, in an example where the TEE hardware backend is an encrypted VM backend such as TDX or SEV, the TR 244 is packaged into a template trusted virtual appliance (VM image). For instance, see the enclave 232 in system 200.

In some examples, the TR 244 is configured to offer common services and/or components to all TEE hardware backends. The TR 244 is developed for each backend as a collection of bootstrapping utilities and bare-metal dynamic libraries. These include bootstrap code 252 for basic enclave environment initialization; an enclave binary linker 250; an enclave binary program loader 248; and platform-independent enclave runtime services 246. Further, in some examples, these runtime services 246 include attestation, key derivation, low-level enclave control primitives, and/or other non-standard utilities.

In some examples, the bootstrap code 252 performs the hardware and runtime setup for the corresponding TEE hardware backend to prepare for universal enclave binary execution. The deployment process determines the type of the TEE hardware backend initially such that the bootstrap code 252 is enabled to determine the operations to be performed for setup. In some examples, the setup process is minimal, in that only basic runtime configuration is needed, such as for explicit communications. Additionally, in some such examples, the enclave uses a user process context, such that a user process is created in the backend that contains code for handling communications with the secure application and/or the TR inside the enclave.

In some examples where the enclaves are VM-based, the bootstrap code 252 performs operations to initialize a virtual platform to bring the VM into a state ready to execute user code.

Further, in some examples, the linker 250 of the TR 244 performs dynamic linking operations that link the universal enclave binary 225 to the enclave runtime dynamic libraries. In such examples, the linking is performed after the operations performed by the bootstrap code 252. Dynamic linking procedures such as relocations are carried out by the linker 250 during this process. Additionally, or alternatively, references to functions and/or other elements of an ISA binary of the universal enclave binary 225 are linked to references and/or interfaces in the enclave runtime dynamic library, enabling applications in the enclave to perform functions and/or otherwise access elements of the ISA binary within the enclave using the links in the runtime dynamic library.

In some examples, the loader 248 performs operations to load the linked binary into the enclave memory and to start the execution from the enclave entry point. For instance, the linked ISA binary 226 is loaded in the enclave 230 as enclave binary 236 and the ISA binary 228 is loaded in the enclave 232 as enclave binary 240. In some examples, both the linker 250 and the loader 248 handle the selection of the correct binary format when the fat binary is used for multiple ISA support. Such a selection is based on determining the ISA with which the TEE hardware backend is compatible or the like.

Further, in some examples, the runtime services 246 are configured to provide interfaces that enable other programs or applications to interact with the enclave. These interfaces are abstracted from the ISA binaries in the universal enclave binary 225, such that the universal enclave binary 225 does not have any dependencies other than to the enclave runtime. Hence, it is possible to execute the interfaces provided by the runtime services 246 in any TR, regardless of the different hardware backends.

In some examples, the interfaces include an attestation function that retrieves the platform-dependent attestation report with user data included; a key derivation function that retrieves keys derived from hardware Root of Trust based on the key type specified; enclave control functions for entering and exiting the enclave; and utility functions such as a random number generator function that abstracts equivalent functions provided by the underlying hardware backend.

Further, in some examples, the enclave control functions include a "wait for ECALL" function that serves as an entry point for the enclave code to wait for incoming enclave calls, or ECALLS. Such a function is abstracted to support the ISA binaries 226-228 of the universal enclave binary 225, enabling the described TRs to handle differing communication and context switch mechanisms of different hardware backends. Similarly, the enclave control functions include an exit function that is also abstracted to be compatible with equivalent exit functionality of the different hardware backends with which the TR is compatible. In some examples, the enclave control functions further include functions to handle temporarily leaving the enclave to handle OCALLs from within the enclave and returning to the same point within the enclave when finished.

Additionally, or alternatively, in other examples, the runtime interfaces provided by the runtime services 246 of the TR 244 are extended to include other functions, such as functions that enable exception handling, multi-threading support, or the like.

It should be understood that, in some examples, the interfaces provided enable the development of applications against higher level Software Development Kits (SDKs). These applications are enabled to use the TR-based enclaves as universal binaries without directly using the TR runtime interfaces. For instance, developers using such an SDK can use higher level SDK-interfaces during development of an application, while the SDK is configured use the TR runtime interfaces when necessary. In such examples, an application developed using such an SDK operates an enclave 230-232 as described herein. As a result, the described SDK provides cross-platform support of the various supported TEEs at no extra cost.

Figure 3:
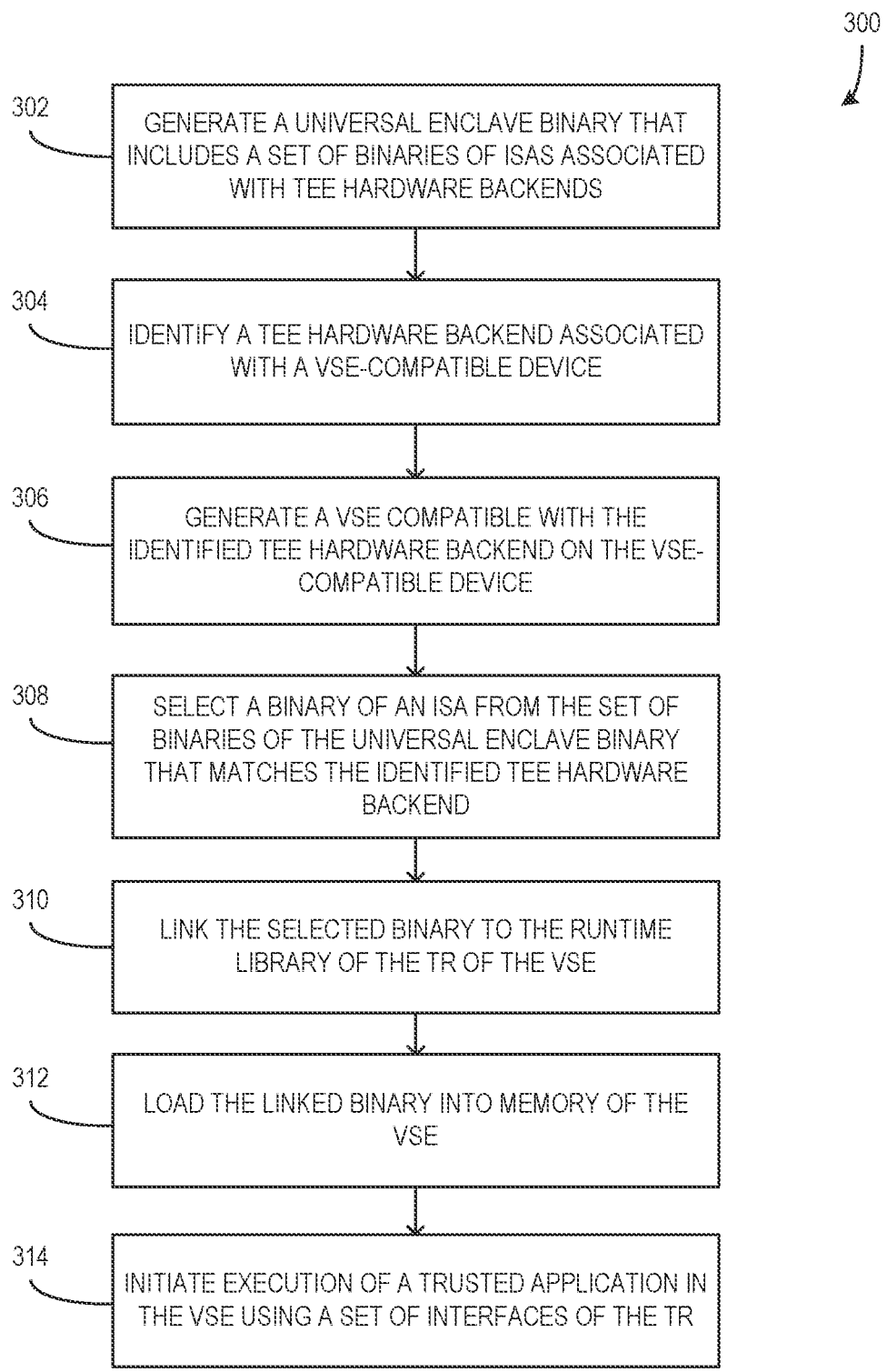
FIG. 3 is a flowchart illustrating a method for deploying a virtual secure enclave using a universal enclave binary and a trusted runtime.

FIG. 3 is a flowchart illustrating a method 300 for deploying a virtual secure enclave (e.g., an enclave 230-232) a using a universal enclave binary 225 and a trusted runtime 244. In some examples, the method 300 is executed or otherwise performed in a system such as system 100 of FIG. 1 and/or system 200 of FIG. 2.

At 302, a universal enclave binary is generated that includes a set of binaries of ISAs associated with TEE hardware backends. In some examples, the universal enclave binary is configured as a fat binary that includes the binaries of multiple ISAs (e.g., a binary for an x86 ISA and a binary for an Aarch64 ISA). Further, in some examples, the ISA binaries included in the universal enclave binary are selected or otherwise determined by a user or other entity that configures the described VSE architecture and/or platform.

At 304, a TEE hardware backend associated with a VSE-compatible device is identified. In some examples, the VSE-compatible device is selected by an entity of the system as a target for hosting a VSE. For instance, in an example in system 100, the enclave manager 124 selects one or more devices of the hardware platform 102 to host a VSE such as enclave VM 114-EN. Further, in some examples, more than one VSE-compatible devices are selected for hosting the VSE. For instance, in an example, a VSE uses data storage of a first device and memory of a second device. The VSE-compatible device is configured to include and/or be compatible with at least one TEE hardware backend. The identified TEE hardware backend is one of those included or compatible with the VSE-compatible device. In some cases, the VSE-compatible device is only compatible with one TEE hardware backend, which is the TEE hardware backend identified at 304. In some examples, the identification of the backend is based on hardware architectural data stored by the VSE-compatible device that indicates a particular TEE hardware backend.

At 306, a VSE compatible with the identified TEE hardware backend is generated on the VSE-compatible device. In some examples, the generated VSE is configured to be compatible with the TEE hardware backend through the use of a universal enclave binary as described herein. Further, in some examples, the generation of the VSE on the device includes execution of bootstrap code (e.g., bootstrap code 252) on the device to initialize and/or otherwise configure the VSE for operation thereon. Additionally, or alternatively, in some examples, the generation of the VSE includes initializing a VM or other VCI in a virtualization platform with which the VSE-compatible device is associated, wherein the generated VSE is deployed to the initialized VM.

At 308, a binary of an ISA is selected from the set of binaries of the universal enclave binary that matches the identified TEE hardware backend. In some examples, the selected ISA binary is determined by comparing the identified TEE hardware backend to the available ISA binaries in the universal enclave binary. In some examples, the universal enclave binary or other entity of the system includes a list, map, or other data structure that stores the relationship data that links types of TEE hardware backends with compatible ISA binaries. In such examples, this data structure is used with a type of the identified TEE hardware backend to select the ISA binary. Alternatively, or additionally, in some examples, the TEE hardware backend includes ISA indication data that indicates one or more ISAs with which the TEE hardware backend is compatible. In such examples, this indication data is used to select the ISA binary.

At 310, the selected binary is linked to the runtime library of the TR of the VSE and, at 312, the linked binary is loaded into the memory of the VSE. In some examples, the linking of the selected binary to the runtime library includes linking function calls of the selected binary to function calls in the runtime library that are associated with the set of interfaces of the TR. In some examples, this includes identifying a function call in the selected binary that is specific to the selected binary, determining a function call of the TR that is equivalent to the identified function call, and linking the identified function call in the selected binary to the determined function call of the TR in the runtime library of the TR. Function calls directed at the interface associated with the determined function call cause the identified function call in the selected binary to be invoked, executed, or otherwise performed. Those formed links and the associated binary data are then loaded into the memory of the VSE, such that the VSE is enabled to perform the associated operations.

At 314, execution of a trusted application is initiated in the VSE using the set of interfaces of the TR. In some examples, the trusted application has been compiled or otherwise configured to use the set of interfaces of the TR specifically, such that the trusted application is not dependent on the type of TEE hardware backend that is linked to the VSE.

It should be understood that, in some examples, another VSE of the same type can be deployed to a different device and/or TEE hardware backend without recompiling due to the use of the universal enclave binary that stores ISA binaries of multiple types and due to the layer of abstraction provided by the TR from the functions of the ISA binaries, as described herein.

Figure 4:
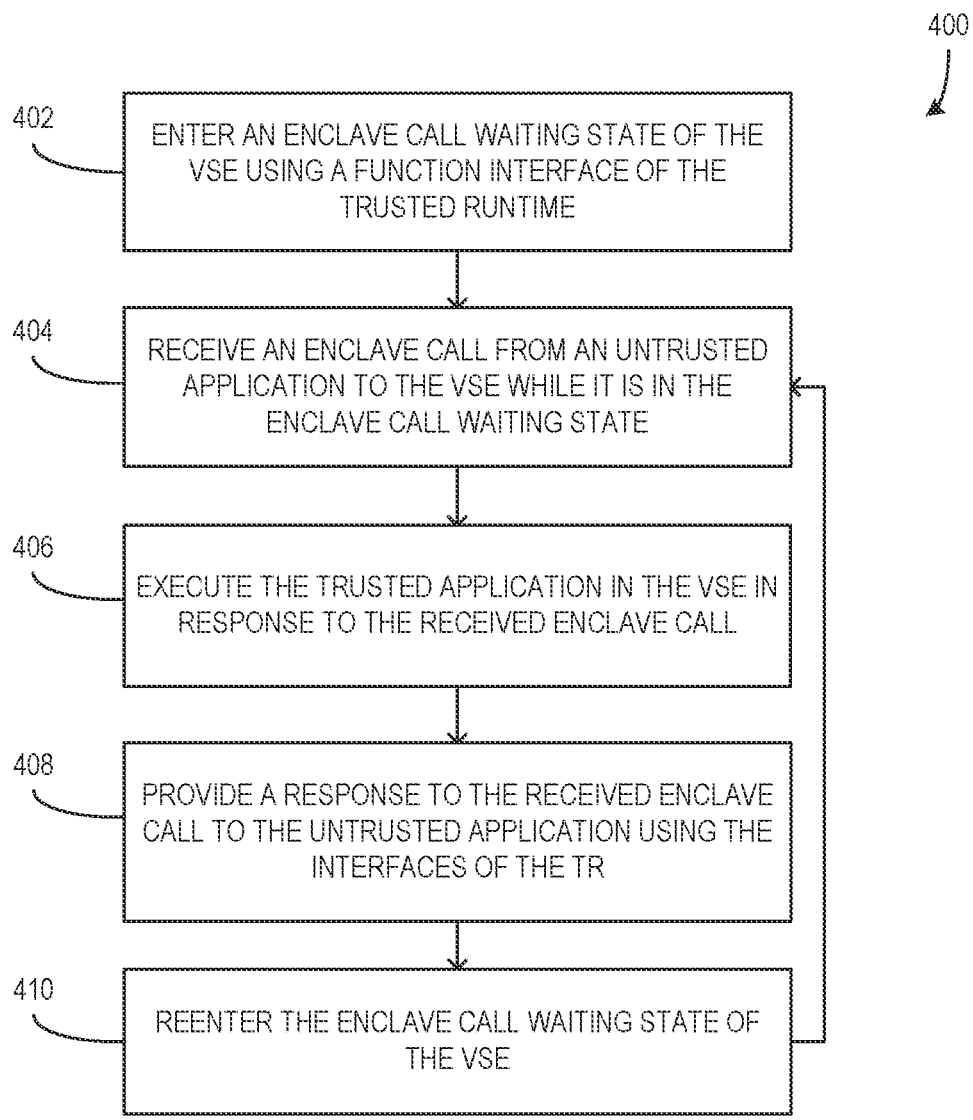
FIG. 4 is a flowchart illustrating a method for operating a virtual secure enclave using a trusted runtime.

FIG. 4 is a flowchart illustrating a method 400 for operating a virtual secure enclave (e.g., an enclave 230-232) using a trusted runtime 244. In some examples, the method 400 is executed or otherwise performed in a system such as system 100 of FIG. 1 and/or system 200 of FIG. 2.

At 402, the VSE enters an enclave call, or ECALL, waiting state using a function interface of the TR. In some examples, the function interface used is associated with a function in the runtime library of the TR that has been obtained from an associated ISA binary in the universal enclave binary as described herein.

At 404, an enclave call from an untrusted application is received by the VSE while in the enclave call waiting state. In some examples, the enclave call is a request for information that is securely stored in the VSE.

At 406, the trusted application in the VSE is executed in response to the received enclave call. In some examples, the trusted application is configured to retrieve and provide securely stored information. Additionally, or alternatively, the trusted application and/or other elements of the VSE are configured to verify that the untrusted application is approved to have access to the requested information.

At 408, a response is provided to the untrusted application using the interfaces of the TR. In some examples, the response to the untrusted application includes exiting the secure enclave context and providing the requested data to the untrusted application. In some examples, exiting the secure enclave context of the VSE is temporary and, at 410, the VSE reenters the enclave call waiting state to wait for more enclave calls. Alternatively, in some examples, exiting the secure enclave context of the VSE causes the operations of the VSE to end until it is restarted by another entity or operation.

Figure 5:
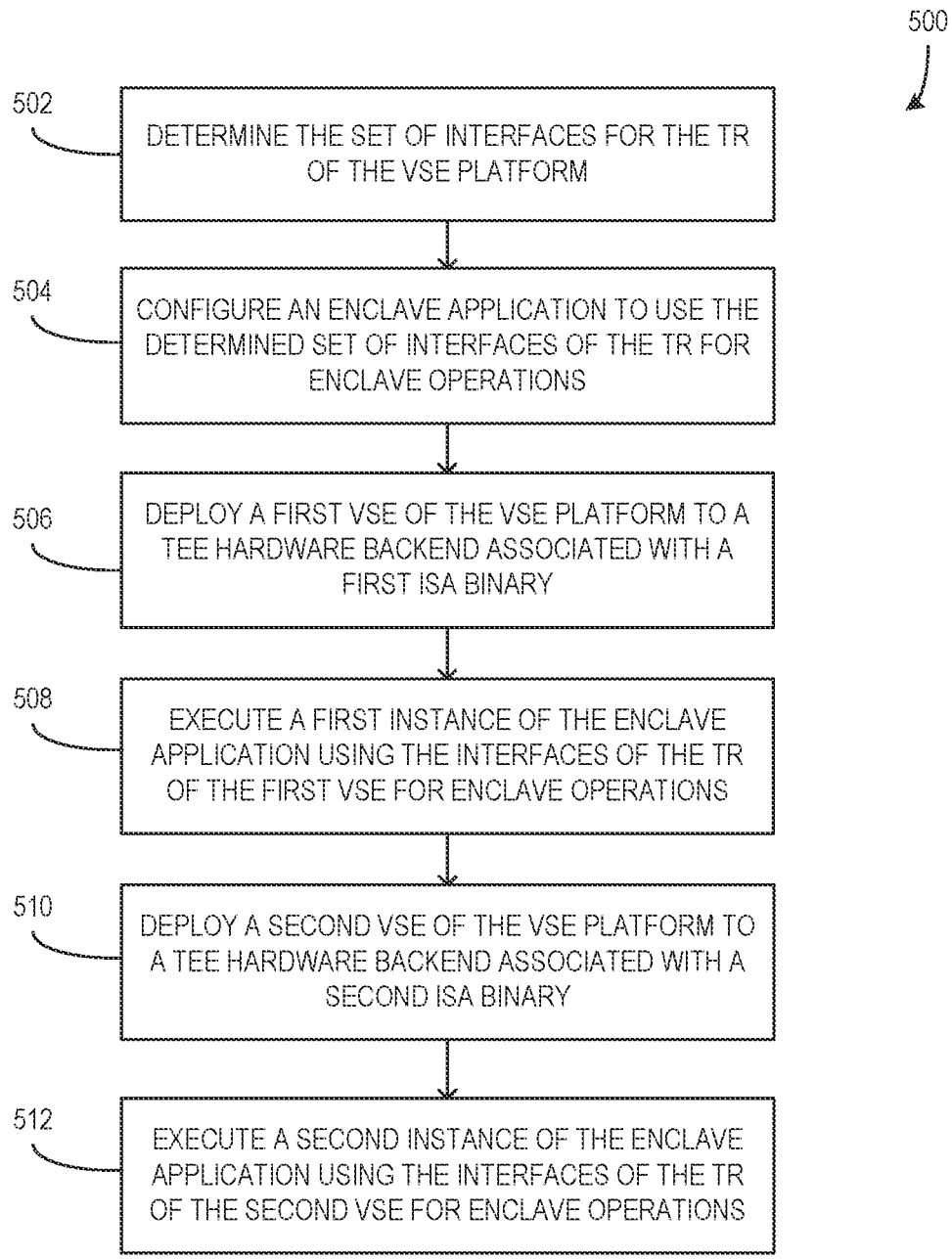
FIG. 5 is a flowchart illustrating a method for using a virtual secure enclave as a universal binary for an enclave application.

FIG. 5 is a flowchart illustrating a method 500 for using a virtual secure enclave (e.g., an enclave 230-232) as a universal binary for an enclave application. In some examples, the method 500 is executed or otherwise performed in a system such as system 100 of FIG. 1 and/or system 200 of FIG. 2.

At 502, a set of interfaces for the TR of the VSE platform are determined. In some examples, the set of interfaces includes an attestation interface, a key derivation interface, one or more enclave control interfaces, and one or more utility interfaces (e.g., a random number generator interface) as described herein.

At 504, an enclave application is configured to use the determined set of interfaces of the TR for enclave operations. In some examples, the configuring of the enclave application includes compiling the code of the enclave application in such a way that the resulting binary is compatible with the set of interfaces of the TR.

At 506, a first VSE of the VSE platform is deployed to a TEE hardware backend associated with a first ISA binary. In some examples, the first ISA binary is a binary with which the VSE is configured to operate through the use of a universal enclave binary as described herein. In some examples, the TEE hardware backend is selected for use with the first VSE based at least in part on its compatibility with the first ISA binary.

At 508, a first instance of the enclave application is executed using the interfaces of the first VSE for enclave operations. As described herein, the first VSE includes interfaces of its TR that act as a layer of abstraction from the specific functions in the first ISA binary, such that the enclave application need not be reconfigured to make use of that first ISA binary directly.

At 510, a second VSE of the VSE platform is deployed to a TEE hardware background associated with a second ISA binary and, at 512, a second instance of the enclave application is executed using the interfaces of the TR of the second VSE for enclave operations. As with the first VSE, the second instance of the enclave application is configured to operate with the interfaces of the TR of the second VSE, rather than requiring reconfiguration or recompilation to use the functions of the second ISA binary directly. Further, it should be understood that the interfaces of the first and second VSEs as exposed to the instances of the enclave application are identical, while the links within the runtime libraries of the separate VSEs may differ due to differences between the first and second ISA binaries.

Exemplary Operating Environment

Figure 6:
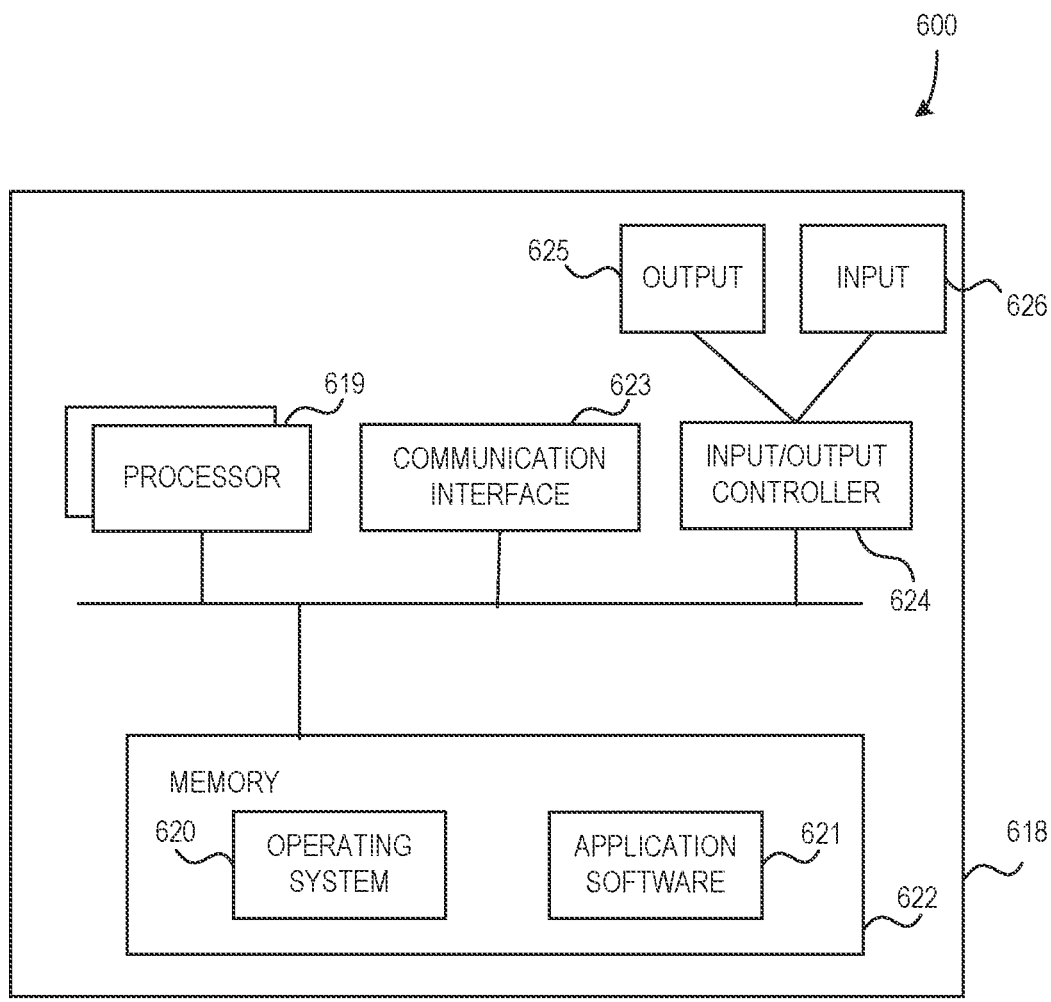
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, deploying VSEs using a universal enclave binary and trusted runtime as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: generate a universal enclave binary that includes a set of binaries of instruction set architectures (ISAs) associated with a plurality of trusted execution environment (TEE) hardware backends; identify a TEE hardware backend of the plurality of TEE hardware backends associated with a VSE-compatible device; generate a virtual secure enclave (VSE) compatible with the identified TEE hardware backend on the VSE-compatible device; select a binary of an ISA from the set of binaries of the universal enclave binary, wherein the selected binary matches the identified TEE hardware backend with which the generated VSE is compatible; link the selected binary to a runtime library of a trusted runtime (TR) of the generated VSE; load the linked binary into memory of the generated VSE; and initiate execution of a trusted application in the generated VSE using a set of interfaces of the TR.

An example computerized method comprises: generating a universal enclave binary that includes a set of binaries of instruction set architectures (ISAs) associated with a plurality of trusted execution environment (TEE) hardware backends; identifying a TEE hardware backend of the plurality of TEE hardware backends associated with a VSE-compatible device; generating a virtual secure enclave (VSE) compatible with the identified TEE hardware backend on the VSE-compatible device; selecting a binary of an ISA from the set of binaries of the universal enclave binary, wherein the selected binary matches the identified TEE hardware backend with which the generated VSE is compatible; linking the selected binary to a runtime library of a trusted runtime (TR) of the generated VSE; loading the linked binary into memory of the generated VSE; and initiating execution of a trusted application in the generated VSE using a set of interfaces of the TR.

One or more computer storage media have computer-executable instructions that, upon execution by a processor, cause the processor to at least: generate a universal enclave binary that includes a set of binaries of instruction set architectures (ISAs) associated with a plurality of trusted execution environment (TEE) hardware backends; identify a TEE hardware backend of the plurality of TEE hardware backends associated with a VSE-compatible device; generate a virtual secure enclave (VSE) compatible with the identified TEE hardware backend on the VSE-compatible device; select a binary of an ISA from the set of binaries of the universal enclave binary, wherein the selected binary matches the identified TEE hardware backend with which the generated VSE is compatible; link the selected binary to a runtime library of a trusted runtime (TR) of the generated VSE; load the linked binary into memory of the generated VSE; and initiate execution of a trusted application in the generated VSE using a set of interfaces of the TR.

Alternatively, or in addition to the other examples described herein, examples include any combination of the following:

further comprising: entering an enclave call waiting state of the generated VSE; receiving an enclave call from an untrusted application to the generated VSE while it is in the enclave call waiting state via the set of interfaces of the TR; executing the trusted application in the generated VSE in response to the received enclave call; providing a response to the received enclave call to the untrusted application using the set of interfaces of the TR, wherein the response is based at least in part on executing the trusted application in the generated VSE; and reentering the enclave call waiting state of the generated VSE.

wherein generating the VSE includes at least one of the following: initializing a virtual machine (VM) in a virtualization platform with which the VSE-compatible device is associated, wherein the generated VSE is deployed to the initialized VM; and deploying the VSE to the VSE-compatible device as an enclave process.

further comprising deploying the generated VSE to a virtual machine.

further comprising deploying the generated VSE to a user process or an enclave process.

wherein linking the selected binary to a runtime library of the TR further includes: identifying a function call in the selected binary that is specific to the selected binary; determining a function call of the TR that is equivalent to the identified function call, wherein the determined function call is associated with an interface of the set of interfaces of the TR; and linking the identified function call in the selected binary to the determined function call of the TR in the runtime library of the TR, whereby function calls directed at the interface associated with the determined function call cause the identified function call in the selected binary to be invoked.

further comprising deploying a second VSE, the deploying of the second VSE including: identifying another TEE hardware backend of the plurality of TEE hardware backends associated with another VSE-compatible device; generating the second VSE compatible with the other TEE hardware backend on the other VSE-compatible device; selecting another binary of an ISA from the set of binaries of the universal enclave binary, wherein the selected other binary matches the other TEE hardware backend with which the second generated VSE is compatible; linking the selected other binary to a runtime library of a second TR of the second generated VSE; loading the linked other binary into memory of the second generated VSE; and initiating execution of the trusted application in the second generated VSE using a set of interfaces of the second TR.

wherein the set of interfaces of the TR include at least one of the following: an attestation interface, a key derivation interface, an enclave control interface, and a utility interface.

wherein the set of interfaces of the TR includes a plurality of enclave control interfaces, wherein the plurality of enclave control interfaces includes at least one of the following: a function for entering an enclave call waiting state, a function for temporarily exiting the VSE to handle a call to an application outside the VSE, and a function for exiting the VSE to provide a response to an enclave call.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for generating a universal enclave binary that includes a set of binaries of instruction set architectures (ISAs) associated with a plurality of trusted execution environment (TEE) hardware backends; exemplary means for identifying a TEE hardware backend of the plurality of TEE hardware backends associated with a VSE-compatible device; exemplary means for generating a virtual secure enclave (VSE) compatible with the identified TEE hardware backend on the VSE-compatible device; exemplary means for selecting a binary of an ISA from the set of binaries of the universal enclave binary, wherein the selected binary matches the identified TEE hardware backend with which the generated VSE is compatible; exemplary means for linking the selected binary to a runtime library of a trusted runtime (TR) of the generated VSE; exemplary means for loading the linked binary into memory of the generated VSE; and exemplary means for initiating execution of a trusted application in the generated VSE using a set of interfaces of the TR.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a memory comprising computer program code, the memory and the computer program code configured to cause the processor to:
   generate a universal enclave binary that includes a set of binaries of instruction set architectures (ISAs) associated with a plurality of trusted execution environment (TEE) hardware backends;
   identify a TEE hardware backend of the plurality of TEE hardware backends associated with a virtual secure enclave (VSE)-compatible device;
   generate a (VSE) compatible with the identified TEE hardware backend on the VSE-compatible device;
   select a binary of an ISA from the set of binaries of the universal enclave binary, wherein the selected binary matches the identified TEE hardware backend with which the generated VSE is compatible;
   link the selected binary to a runtime library of a trusted runtime (TR) of the generated VSE;
   load the linked binary into memory of the generated VSE; and
   initiate execution of a trusted application in the generated VSE using a set of interfaces of the TR.

2. The system of claim 1, wherein the memory and the computer program code are configured to, with the processor, further cause the processor to:
   enter an enclave call waiting state of the generated VSE;
   receive an enclave call from an untrusted application to the generated VSE while it is in the enclave call waiting state via the set of interfaces of the TR;
   execute the trusted application in the generated VSE in response to the received enclave call;
   provide a response to the received enclave call to the untrusted application using the set of interfaces of the TR, wherein the response is based at least in part on executing the trusted application in the generated VSE; and
   reenter the enclave call waiting state of the generated VSE.

3. The system of claim 1, wherein the memory and the computer program code are configured to, with the processor, further cause the processor to:
   deploy the generated VSE to (1) a virtual machine in a virtualization platform with which the VSE-compatible device is associated, or (2) a user process associated with the VSE-compatible device.

4. The system of claim 1, wherein linking the selected binary to a runtime library of the TR further includes:
   identifying a function call in the selected binary that is specific to the selected binary;
   determining a function call of the TR that is equivalent to the identified function call, wherein the determined function call is associated with an interface of the set of interfaces of the TR; and
   linking the identified function call in the selected binary to the determined function call of the TR in the runtime library of the TR, whereby function calls directed at the interface associated with the determined function call cause the identified function call in the selected binary to be invoked.

5. The system of claim 1, wherein the memory and the computer program code are configured to, with the processor, further cause the processor to deploy a second VSE, the deploying of the second VSE including:
   identifying another TEE hardware backend of the plurality of TEE hardware backends associated with another VSE-compatible device;
   generating the second VSE compatible with the other TEE hardware backend on the other VSE-compatible device;
   selecting another binary of an ISA from the set of binaries of the universal enclave binary, wherein the selected other binary matches the other TEE hardware backend with which the second generated VSE is compatible;
   linking the selected other binary to a runtime library of a second TR of the second generated VSE;
   loading the linked other binary into memory of the second generated VSE; and
   initiating execution of the trusted application in the second generated VSE using a set of interfaces of the second TR.

6. The system of claim 1, wherein the set of interfaces of the TR include at least one of the following: an attestation interface, a key derivation interface, an enclave control interface, and a utility interface.

7. The system of claim 6, wherein the set of interfaces of the TR includes a plurality of enclave control interfaces, wherein the plurality of enclave control interfaces includes at least one of the following: a function for entering an enclave call waiting state, a function for temporarily exiting the VSE to handle a call to an application outside the VSE, and a function for exiting the VSE to provide a response to an enclave call.

8. A computerized method comprising:
   generating a universal enclave binary that includes a set of binaries of instruction set architectures (ISAs) associated with a plurality of trusted execution environment (TEE) hardware backends;
   identifying a TEE hardware backend of the plurality of TEE hardware backends associated with a virtual secure enclave (VSE)-compatible device;
   generating a (VSE) compatible with the identified TEE hardware backend on the VSE-compatible device;
   selecting a binary of an ISA from the set of binaries of the universal enclave binary, wherein the selected binary matches the identified TEE hardware backend with which the generated VSE is compatible;
   linking the selected binary to a runtime library of a trusted runtime (TR) of the generated VSE;
   loading the linked binary into memory of the generated VSE; and
   initiating execution of a trusted application in the generated VSE using a set of interfaces of the TR.

9. The computerized method of claim 8, further comprising:
   entering an enclave call waiting state of the generated VSE;
   receiving an enclave call from an untrusted application to the generated VSE while it is in the enclave call waiting state via the set of interfaces of the TR;
   executing the trusted application in the generated VSE in response to the received enclave call;
   providing a response to the received enclave call to the untrusted application using the set of interfaces of the TR, wherein the response is based at least in part on executing the trusted application in the generated VSE; and
   reentering the enclave call waiting state of the generated VSE.

10. The computerized method of claim 8, further comprising deploying the generated VSE to (1) a virtual machine in a virtualization platform with which the VSE-compatible device is associated, or (2) an enclave process associated with the VSE-compatible device.

11. The computerized method of claim 8, wherein linking the selected binary to a runtime library of the TR further includes:
  identifying a function call in the selected binary that is specific to the selected binary;
  determining a function call of the TR that is equivalent to the identified function call, wherein the determined function call is associated with an interface of the set of interfaces of the TR; and
  linking the identified function call in the selected binary to the determined function call of the TR in the runtime library of the TR, whereby function calls directed at the interface associated with the determined function call cause the identified function call in the selected binary to be invoked.

12. The computerized method of claim 8, further comprising deploying a second VSE, the deploying of the second VSE including:
  identifying another TEE hardware backend of the plurality of TEE hardware backends associated with another VSE-compatible device;
  generating the second VSE compatible with the other TEE hardware backend on the other VSE-compatible device;
  selecting another binary of an ISA from the set of binaries of the universal enclave binary, wherein the selected other binary matches the other TEE hardware backend with which the second generated VSE is compatible;
  linking the selected other binary to a runtime library of a second TR of the second generated VSE;
  loading the linked other binary into memory of the second generated VSE; and
  initiating execution of the trusted application in the second generated VSE using a set of interfaces of the second TR.

13. The computerized method of claim 8, wherein the set of interfaces of the TR include at least one of the following: an attestation interface, a key derivation interface, an enclave control interface, and a utility interface.

14. The computerized method of claim 13, wherein the set of interfaces of the TR includes a plurality of enclave control interfaces, wherein the plurality of enclave control interfaces includes at least one of the following: a function for entering an enclave call waiting state, a function for temporarily exiting the VSE to handle a call to an application outside the VSE, and a function for exiting the VSE to provide a response to an enclave call.

15. One or more computer storage media having computer-executable instructions that, upon execution by a processor, cause the processor to at least:
  generate a universal enclave binary that includes a set of binaries of instruction set architectures (ISAs) associated with a plurality of trusted execution environment (TEE) hardware backends;
  identify a TEE hardware backend of the plurality of TEE hardware backends associated with a virtual secure enclave (VSE)-compatible device;
  generate a (VSE) compatible with the identified TEE hardware backend on the VSE-compatible device;
  select a binary of an ISA from the set of binaries of the universal enclave binary, wherein the selected binary matches the identified TEE hardware backend with which the generated VSE is compatible;
  link the selected binary to a runtime library of a trusted runtime (TR) of the generated VSE;
  load the linked binary into memory of the generated VSE; and
  initiate execution of a trusted application in the generated VSE using a set of interfaces of the TR.

16. The one or more computer storage media of claim 15, wherein the computer-executable instructions, upon execution by a processor, further cause the processor to at least:
  enter an enclave call waiting state of the generated VSE;
  receive an enclave call from an untrusted application to the generated VSE while it is in the enclave call waiting state via the set of interfaces of the TR;
  execute the trusted application in the generated VSE in response to the received enclave call;
  provide a response to the received enclave call to the untrusted application using the set of interfaces of the TR, wherein the response is based at least in part on executing the trusted application in the generated VSE; and
  reenter the enclave call waiting state of the generated VSE.

17. The one or more computer storage media of claim 15, wherein the computer-executable instructions, upon execution by a processor, further cause the processor to at least:
  deploy the generated VSE to (1) a virtual machine in a virtualization platform with which the VSE-compatible device is associated, or (2) a user process associated with the VSE-compatible device.

18. The one or more computer storage media of claim 15, wherein linking the selected binary to a runtime library of the TR further includes:
  identifying a function call in the selected binary that is specific to the selected binary;
  determining a function call of the TR that is equivalent to the identified function call, wherein the determined function call is associated with an interface of the set of interfaces of the TR; and
  linking the identified function call in the selected binary to the determined function call of the TR in the runtime library of the TR, whereby function calls directed at the interface associated with the determined function call cause the identified function call in the selected binary to be invoked.

19. The one or more computer storage media of claim 15, wherein the computer-executable instructions, upon execution by a processor, further cause the processor to at least deploy a second VSE, the deploying of the second VSE including:
  identifying another TEE hardware backend of the plurality of TEE hardware backends associated with another VSE-compatible device;
  generating the second VSE compatible with the other TEE hardware backend on the other VSE-compatible device;
  selecting another binary of an ISA from the set of binaries of the universal enclave binary, wherein the selected other binary matches the other TEE hardware backend with which the second generated VSE is compatible;
  linking the selected other binary to a runtime library of a second TR of the second generated VSE;
  loading the linked other binary into memory of the second generated VSE; and initiating execution of the trusted application in the second generated VSE using a set of interfaces of the second TR.

20. The one or more computer storage media of claim 15, wherein the set of interfaces of the TR include at least one of the following: an attestation interface, a key derivation interface, an enclave control interface, and a utility interface.

* * * * *